United States Patent
Ashcraft et al.

(10) Patent No.: US 9,880,849 B2
(45) Date of Patent: Jan. 30, 2018

(54) ALLOCATION OF LOAD INSTRUCTION(S) TO A QUEUE BUFFER IN A PROCESSOR SYSTEM BASED ON PREDICTION OF AN INSTRUCTION PIPELINE HAZARD

(71) Applicant: APPLIED MICRO CIRCUITS CORPORATION, Sunnyvale, CA (US)

(72) Inventors: Matthew Ashcraft, Belmont, CA (US); Richard W. Thaik, San Jose, CA (US)

(73) Assignee: MACOM CONNECTIVITY SOLUTIONS, LLC, Lowell, MA (US)

( * ) Notice: Subject to any disclaimer, the term of this patent is extended or adjusted under 35 U.S.C. 154(b) by 640 days.

(21) Appl. No.: 14/100,228

(22) Filed: Dec. 9, 2013

(65) Prior Publication Data

US 2015/0160945 A1    Jun. 11, 2015

(51) Int. Cl.
*G06F 9/38* (2006.01)
*G06F 9/30* (2006.01)

(52) U.S. Cl.
CPC ........ *G06F 9/3842* (2013.01); *G06F 9/30043* (2013.01); *G06F 9/3834* (2013.01); *G06F 9/3836* (2013.01)

(58) Field of Classification Search
CPC ........................... G06F 9/30043; G06F 9/3836
USPC .......................................................... 712/216
See application file for complete search history.

(56) References Cited

U.S. PATENT DOCUMENTS

| | | | | |
|---|---|---|---|---|
| 5,420,991 A | * | 5/1995 | Konigsfeld | G06F 9/30043 711/150 |
| 5,615,350 A | * | 3/1997 | Hesson | G06F 9/383 711/E12.02 |
| 5,903,768 A | * | 5/1999 | Sato | G06F 9/383 712/1 |
| 6,484,254 B1 | * | 11/2002 | Chowdhury | G06F 9/3851 711/169 |
| 6,526,499 B2 | | 2/2003 | Palanca et al. | |
| 6,854,048 B1 | * | 2/2005 | Dice | G06F 9/30181 711/147 |
| 6,868,491 B1 | * | 3/2005 | Moore | G06F 9/3017 712/216 |
| 7,003,648 B2 | | 2/2006 | Chrysos et al. | |
| 7,853,738 B2 | | 12/2010 | Pothireddy et al. | |
| 8,087,029 B1 | | 12/2011 | Lindholm et al. | |
| 8,108,872 B1 | | 1/2012 | Lindholm et al. | |
| 8,176,257 B2 | | 5/2012 | Wadhawan et al. | |
| 2007/0288726 A1 | * | 12/2007 | Luick | G06F 9/3853 712/225 |

(Continued)

OTHER PUBLICATIONS

John L. Hennessy and David A. Patterson. Computer Architecture, Fifth Edition: A Quantitative Approach (4th ed.). 2007. Morgan Kaufmann Publishers Inc., San Francisco, CA, USA. pp. 94-103.*

*Primary Examiner* — Andrew Caldwell
*Assistant Examiner* — Michael Metzger
(74) *Attorney, Agent, or Firm* — Amin, Turocy & Watson LLP

(57) ABSTRACT

Various aspects provide for detecting ordering violations in a memory system. A system includes a prediction component and an execution component. The prediction component predicts whether a load instruction in the system is associated with an instruction pipeline hazard. The execution component allocates the load instruction to a queue buffer in the system in response to a prediction that the load instruction is not associated with the instruction pipeline hazard.

22 Claims, 10 Drawing Sheets

(56) References Cited

U.S. PATENT DOCUMENTS

2011/0153986 A1* 6/2011 Alexander .............. G06F 9/383
                                                    712/205
2012/0102357 A1* 4/2012 Ramani ................. G06F 9/3861
                                                    714/15

* cited by examiner

ALLOCATION OF LOAD INSTRUCTION(S) TO A QUEUE BUFFER IN A PROCESSOR SYSTEM BASED ON PREDICTION OF AN INSTRUCTION PIPELINE HAZARD

TECHNICAL FIELD

The subject disclosure relates generally to processor systems, and more particularly to allocation of load instruction(s) to a queue buffer in a processor system.

BACKGROUND

Conventional processor systems can implement an instruction pipeline to increase throughput of processor instructions (e.g., load instructions and store instructions). For example, an instruction pipeline can be divided into multiple stages (e.g., fetch instruction, decode instruction, execute instruction, write-back instruction, etc.) to allow processing of multiple processor instructions in parallel. In certain implementations, a processor can implement out-of-order execution to execute processor instructions based on availability (e.g., availability of processor instructions) rather than an original program order for the processor instructions. For example, each processor instruction (e.g., load instruction and/or store instruction) can be stored in a data structure when decoding operations associated with processor instructions. The processor instructions (e.g., load instructions and/or stores instructions) can then be permitted to execute out-of-order. As such, a processor can avoid being in an idle state while data is retrieved for a next processor instruction (e.g., a processor can process a next processor instruction as soon as data operands associated with the next processor instruction are available).

However, out-of-order execution can lead to memory order violations (e.g., reordering issues), incorrect data, etc. For example, out-of-order execution can lead to an instruction pipeline hazard (e.g., a write after read (WAR) hazard, a write after write (WAW) hazard, etc.). Conventionally, if it is determined that a memory order violation (e.g., an instruction pipeline hazard) has occurred, the violating processor instruction (e.g., load instruction or store instruction) and each subsequent processor instruction are re-executed (e.g., the data structure employed for out-of-order execution is erased and/or reformatted). Therefore, accuracy and/or efficiency of conventional techniques for executing processor instructions (e.g., load instructions and/or store instructions) out-of-order can be improved.

SUMMARY

The following presents a simplified summary in order to provide a basic understanding of some aspects described herein. This summary is not an extensive overview of the disclosed subject matter. It is intended to neither identify key nor critical elements of the disclosure nor delineate the scope thereof. Its sole purpose is to present some concepts in a simplified form as a prelude to the more detailed description that is presented later.

In an example embodiment, a system comprises a prediction component and an execution component. The prediction component is configured for predicting whether a load instruction is associated with an instruction pipeline hazard. The execution component is configured for allocating the load instruction to a queue buffer in response to a prediction that the load instruction is not associated with the instruction pipeline hazard. In an aspect, the execution component is configured for allocating the load instruction to the queue buffer in response to a determination that a memory address is calculated for the load instruction.

In another example embodiment, a method comprises receiving a load instruction and a store instruction, predicting whether a load instruction is associated with an instruction pipeline hazard, and allocating the load instruction to a queue buffer in response to a prediction that the load instruction is not associated with the instruction pipeline hazard. In an aspect, the allocating comprises allocating the load instruction to the queue buffer in response to a determination that a memory address is calculated for the load instruction.

In yet another example embodiment, a system includes a means for receiving a load instruction and a store instruction. The system also includes a means for predicting whether a load instruction is associated with an instruction pipeline hazard. Additionally, the system includes a means for allocating the load instruction to a queue buffer in response to a determination that a memory address is calculated for the load instruction and a prediction that the load instruction is not associated with the instruction pipeline hazard.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and novel features will become apparent from the following detailed description when considered in conjunction with the drawings.

DETAILED DESCRIPTION

Figure 1:
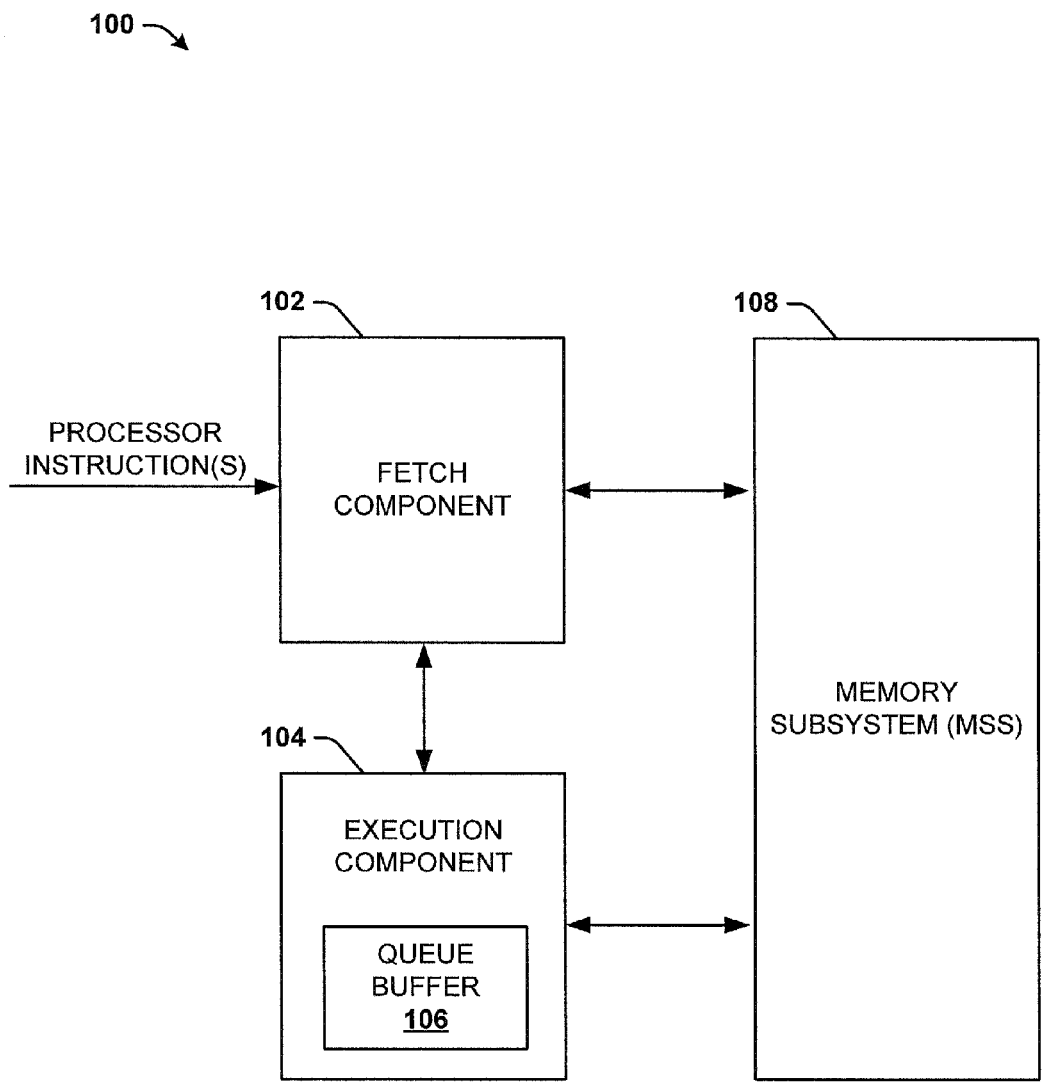
FIG. 1 is a block diagram illustrating an example, non-limiting embodiment of a processor system in accordance with various aspects described herein.

The disclosure herein is described with reference to the drawings, wherein like reference numerals are used to refer to like elements throughout. In the following description, for purposes of explanation, numerous specific details are set forth in order to provide a thorough understanding of the subject innovation. It may be evident, however, that various disclosed aspects can be practiced without these specific details. In other instances, well-known structures and devices are shown in block diagram form in order to facilitate describing the subject innovation.

Various aspects of the present disclosure facilitate detection of ordering violations (e.g., memory order violations) in a processor system. For example, memory order violations (e.g., load instruction ordering violations and/or store instruction ordering violations) in a processor system can be detected using a buffer with selective and/or late allocation of data entries (e.g., processor instructions). In particular, load/store ordering (e.g., allocating load instructions and/or store instructions to buffer, execution of load instructions and/or store instructions, etc.) can be implemented in response to a prediction (e.g., a determination) that a load instruction and/or a store instruction is not associated with an instruction pipeline hazard (e.g., a read after write (RAW) hazard, a write after read (WAR) hazard, a write after write (WAW) hazard, etc.). Additionally or alternatively, load/store ordering can be deferred until a memory address (e.g., a virtual address) for a load instruction and/or a store instruction is calculated. As such, memory order violations and/or instruction pipeline hazards associated with load/store ordering (e.g., allocating load instructions and/or store instructions to a buffer) can be minimized. Furthermore, buffer size for load/store ordering (e.g., data structure size for allocating load instructions and/or store instructions) can be reduced.

Turning now to FIG. 1, a block diagram illustrating an example, non-limiting embodiment of a processor system in accordance with various aspects described herein is shown. System 100 includes a fetch component 102 and an execution component 104. In an aspect, the fetch component 102 can be implemented as an instruction cache and fetch (ICF) component. In another aspect, the execution component 104 can be implemented as at least one load-store (LSU). The execution component 104 can be associated with a queue buffer 106. In one example, the execution component 104 can include the queue buffer 106. In another example, the queue buffer 106 can be implemented separate from the execution component 104. In an aspect, the fetch component 102 can communicate directly with the execution component 104. In another aspect, the fetch component 102 and/or the execution component 104 can be coupled to a memory subsystem (MSS) 108. The MSS 108 can include one or more memory components (e.g., one or more cache memories, one or more components associated with virtual memory, etc.) and/or one or more controllers. However, it is to be appreciated that the MSS 108 can include additional components. In one embodiment, the MSS 108 can be associated with a Level-1 cache, a Level-2 cache and/or main memory.

The system 100 can be implemented in a processor system. For example, the system 100 can be implemented in a multiprocessor system and/or a shared memory system. In one example, the system 100 can be implemented in a memory management apparatus. In an aspect, a processor, e.g., a central processing unit (CPU), can implement the system 100. For example, the system 100 can be implemented to facilitate an instruction cycle (e.g., a fetch-and-execute cycle) of a CPU.

The system 100 can be configured to execute processor instructions (e.g., load instructions and/or store instructions) out-of-order (e.g., the system 100 can implement out-of-order execution). Additionally, the system 100 can be configured to detect memory order violations and/or instruction pipeline hazards based on selective and/or late allocation of processor instructions (e.g., load instructions and/or store instructions) to a buffer (e.g., the queue buffer 106). A load instruction can be a processor instruction to read data from memory. A store instruction can be a processor instruction to update data (e.g., write data) to memory.

The fetch component 102 can receive one or more processor instructions (e.g., PROCESSOR INSTRUCTION(S) shown in FIG. 1). For example, the fetch component 102 can receive a load instruction (e.g., a load operation) and/or a store instruction (e.g., a store operation). In an aspect, the one or more processor instructions can be received from memory (e.g., main memory). In one example, the fetch component 102 can implement an instruction cache component (e.g., a Level-1 cache component) and/or an instruction fetch component. The fetch component 102 can implement a fetch cycle for the load instruction and/or the store instruction (e.g., the fetch component 102 can fetch load/store instructions). The execution component 104 can implement an execute cycle (e.g., out-of-order execution) for the load instruction and/or the store instruction.

The execution component 104 can receive a prediction that predicts whether the load instruction (and/or the store instruction) is associated with an instruction pipeline hazard. For example, an instruction pipeline hazard can be a data hazard (e.g., a RAW hazard, a WAR hazard, a WAW hazard, etc.). In an aspect, the prediction can be generated and/or determined by the fetch component 102. In another aspect, the prediction can be generated and/or determined by the execution component 104. In yet another aspect, the prediction can be generated and/or determined by another component (e.g., an intermediate component, a decode component, etc.) associated with the fetch component 102 and/or the execution component 104. The execution component 104 can generate a memory address (e.g., a virtual address, a physical address, a real address, etc.) for the load instruction and/or the store instruction. However, it is to be appreciated that a different component (e.g., the fetch component 102, a component other than the fetch component 102 and the execution component 104, etc.) can generate a memory address (e.g., a virtual address, a physical address, a real address, etc.) for the load instruction and/or the store instruction. In an aspect, a load instruction and/or a store instruction can be associated with a plurality of memory accesses. As such, a prediction can be generated for each of the plurality of memory access associated with the load instruction and/or the store instruction.

The execution component 104 can be configured to allocate the load instruction to the queue buffer 106 in response to a prediction or a determination that the load instruction is not associated with the instruction pipeline hazard. In an aspect, the execution component 104 can begin a load/store ordering process (e.g., facilitate load/store ordering) when a memory address (e.g., a virtual address, a physical address, a real address, etc.) for the load instruction is determined. For example, load/store ordering can be deferred until a memory address (e.g., a virtual address) for the load instruction is calculated. Therefore, additionally or alternatively, the execution component 104 can be configured to allocate the load instruction to the queue buffer 106 in response to a prediction that a memory address (e.g., a virtual address) is associated with the load instruction.

As such, allocation of load instructions and/or store instructions to a queue buffer (e.g., the queue buffer 106) can occur after an execution process begins (e.g., in response to a memory address for the load instruction being determined). Therefore, the system 100 can more accurately determine whether an ordering violation (e.g., an instruction pipeline hazard) has occurred (e.g., the system 100 can provide better data integrity). In an aspect, the execution component 104 can compare at least a portion of a memory address of the load instruction with at least a corresponding portion of a memory address of the store instruction. In one example, the execution component 104 can compare one or more bits (e.g., one or more least significant bits, one or more untranslated bits, etc.) of the load instruction with one or more bits (e.g., one or more least significant bits, one or more untranslated bits) of the store instruction once a memory address for the load instruction is determined (e.g., to determine instruction dependency). For example, the execution component 104 can compare address bits (e.g., one or more virtual address bits) of the load instruction and the store instruction that are available before (e.g., earlier than) other address bits (e.g., one or more physical address bits) of the load instruction and the store instruction. As such, the execution component 104 can determine dependency (e.g., data dependency) between the load instruction and the store instruction by comparing a memory address associated with the load instruction and a memory address associated with the store instruction.

In response to a determination that the memory address has been calculated for the store instruction and the memory addresses of the load instruction and the store instruction do not match (e.g., the load instruction does not depend on the store instruction), ordering between the load instruction and the store instruction is not tracked (e.g., since there cannot be an ordering hazard between the load instruction and the store instruction). For example, in response to a determination that the memory address has been calculated and the memory addresses of the load instruction and the store instruction do not match, the execution component 104 does not allocate the load instruction to the queue buffer 106 (e.g., the execution component 104 withholds allocation of the load instruction to the queue buffer 106).

However, in response to a determination that the memory address for the store instruction has been calculated and the memory addresses of the load instruction and the store instruction match (or if the memory address for the store has not been calculated), ordering between the load instruction and the store instruction is tracked. For example, in response to a determination that the memory address for the store instruction has been calculated and the memory addresses of the load instruction and the store instruction match, the execution component 104 can configure the load instruction to perform a memory access after the store instruction associated with the load instruction has performed a memory access. In an aspect, a load instruction is not allocated to the queue buffer 106 in response to a determination that a store instruction has executed to a point where ordering violation(s) have been resolved.

In response to a determination that the memory address for the store instruction has not been calculated, ordering between the load instruction and the store instruction can be tracked (e.g., when executing the load instruction and/or the store instruction). In an aspect, ordering between the load instruction and the store instruction can be performed based at least in part on a prediction (e.g., a prediction value). In particular, the fetch component 102 and/or the execution component 104 can receive a prediction that speculates whether the load instruction is associated with an instruction pipeline hazard. For example, the fetch component 102 and/or the execution component 104 can receive a prediction value (e.g., a risk value) associated with likelihood of an instruction pipeline hazard. In one example, a higher prediction value (e.g., a higher risk value) can correspond to a higher likelihood of an instruction pipeline hazard. In another example, different risk values (e.g., low risk, average risk, high risk, etc.) can be assigned to the load instruction based on likelihood of an instruction pipeline hazard. However, it is to be appreciated that different techniques can be implemented to generate a prediction to speculate whether the load instruction is associated with an instruction pipeline hazard.

If the prediction generated by the fetch component 102 speculates that there is an instruction pipeline hazard (e.g., an instruction pipeline hazard is likely, the prediction value is above a certain threshold value, the load instruction is associated with a high risk value, etc.), then the load instruction is not placed into the queue buffer 106. For example, the execution component 104 can configure the load instruction to perform a memory access after the store instruction has performed a memory access.

However, if the prediction speculates that there is not an instruction pipeline hazard (e.g., an instruction pipeline hazard is not likely, the prediction value is below a certain threshold value, the load instruction is associated with a low risk value, etc.), then the load instruction can be stored in the queue buffer 106. For example, the execution component 104 can immediately store the load instruction in an ordering structure (e.g., a data structure) associated with the queue buffer 106 in response to a prediction that there is not an instruction pipeline hazard associated with the load instruction. In an aspect, the load instruction can be stored in the queue buffer 106 with a corresponding memory address (e.g., an entire memory address, a hashed memory address, etc.) for the load instruction. In one example, the queue buffer 106 can be implemented as load queue (or a load/store queue). In another example, the queue buffer 106 can be implemented as a store forwarding buffer.

When the execution component 104 can determine (e.g., confidently determine) whether an instruction pipeline hazard exists (e.g., a memory address for the store instruction has been determined), the execution component 104 can determine whether an instruction pipeline hazard and/or a memory order violation is associated with the queue buffer 106. For example, when the store instruction has executed to the point where the execution component 104 can determine if an instruction pipeline hazard exists (e.g., when a memory address for the store instruction has been determined), the execution component 104 can analyze (e.g., check) an ordering structure associated with the queue buffer 106 for an instruction pipeline hazard and/or a memory order violation. As such, the execution component 104 can determine whether the queue buffer is associated with a memory order violation in response to a memory address (e.g., a physical address) being determined for the store instruction.

If it is determined that the queue buffer 106 is associated with an instruction pipeline hazard and/or a memory order violation, the execution component 104 can cancel and/or discard the execution of the load instruction associated with the store instruction. For example, if it is determined that the load instruction in the queue buffer 106 is associated with an instruction pipeline hazard and/or a memory order violation, the execution of the load instruction associated with the store instruction can be cancelled and/or discarded. Additionally or alternatively, if it is determined that the queue buffer 106 is associated with an instruction pipeline hazard and/or a memory order violation, the execution of the load instruction associated with the store instruction can be re-executed. Furthermore, one or more dependent instructions can be cancelled and/or re-executed if it is determined that the queue buffer 106 is associated with an instruction pipeline hazard and/or a memory order violation. For example, if it is determined that the queue buffer 106 is associated with an instruction pipeline hazard and/or a memory order violation, one or more load instructions allocated to the queue buffer 106 after the load instruction can be cancelled and/or re-executed.

If it is determined that the queue buffer 106 is not associated with an instruction pipeline hazard and/or a memory order violation, the execution component 104 can remove an entry in the queue buffer 106 associated with the load instruction. For example, an entry in the queue buffer 106 associated with the load instruction can be erased.

Therefore, allocation of the data structure can occur later in the load/store ordering process (e.g., an execution cycle has started) when the memory address of the load is determined. Accordingly, size of the data structure (e.g., the queue buffer 106) for load/store ordering can be reduced. As such, the system 100 can facilitate improved accuracy and/or efficiency to detect memory order violations due to out-of-order speculative load/store execution (and load/load execution) by implementing a buffer with selective and/or late allocation of data entries (e.g., load instructions and/or store instructions). Accordingly, instruction pipeline hazards in a processor system can be minimized. In an aspect, determining whether a memory address of the load instruction and a memory address of the store instruction match can be static (e.g., performed for each load instruction and store instruction), and determining whether a memory address for a store instruction has been calculated can be dynamic based on history (e.g., historical data) associated with load instructions and/or store instructions.

Figure 2:
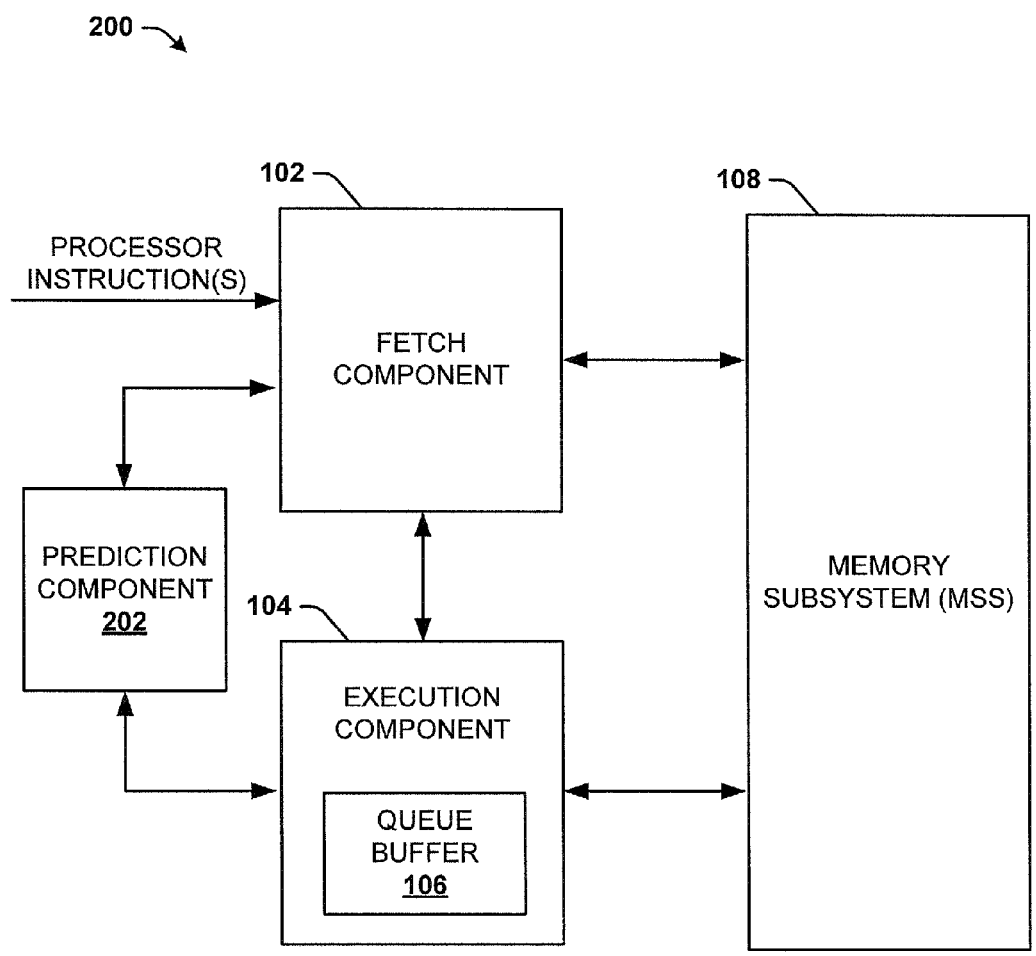
FIG. 2 is a block diagram illustrating another example, non-limiting embodiment of a processor system in accordance with various aspects described herein.

Referring to FIG. 2, a block diagram illustrating an example, non-limiting embodiment of a system in accordance with various aspects described herein is shown. System 200 can include the fetch component 102, the execution component 104 and the queue buffer 106. The fetch component 102 and/or the execution component 104 can be associated with a prediction component 202. In one example, the prediction component 202 can be implemented separate from the fetch component 102 and the execution component 104. In another example, the fetch component 102 can include the prediction component 202. In yet another example, the execution component 104 can include the prediction component 202. In an aspect, the fetch component 102, the execution component 104 and/or the prediction component 202 can be coupled to and/or in communication with the MSS 108.

The prediction component 202 can facilitate instruction pipeline hazard prediction. In an aspect, the prediction component 202 can generate and/or store one or more predictions (e.g., one or more prediction values, one or more risk values) associated with instruction pipeline hazard(s). For example, the prediction component 202 can generate and/or store a prediction (e.g., an instruction pipeline hazard prediction) for the load instruction and/or the store instruction. In one example, the prediction component 202 can implement a hash table to store the one or more prediction values (e.g., the one or more risk values). As such, the prediction component 202 can provide a prediction to speculate whether a load instruction will have an instruction pipeline hazard when executed. As such, the execution component 104 can allocate a load instruction to the queue buffer 106 based at least in part on instruction pipeline hazard predictions (e.g., the one or more prediction values) generated and/or stored by the prediction component 202. In an aspect, the fetch component 102 and/or the execution component 104 can additionally or alternatively facilitate instruction pipeline hazard prediction. For example, the fetch component 102 and/or the execution component 104 can additionally or alternatively generate and/or store one or more predictions (e.g., one or more prediction values, one or more risk values) associated with instruction pipeline hazard(s).

Figure 3:
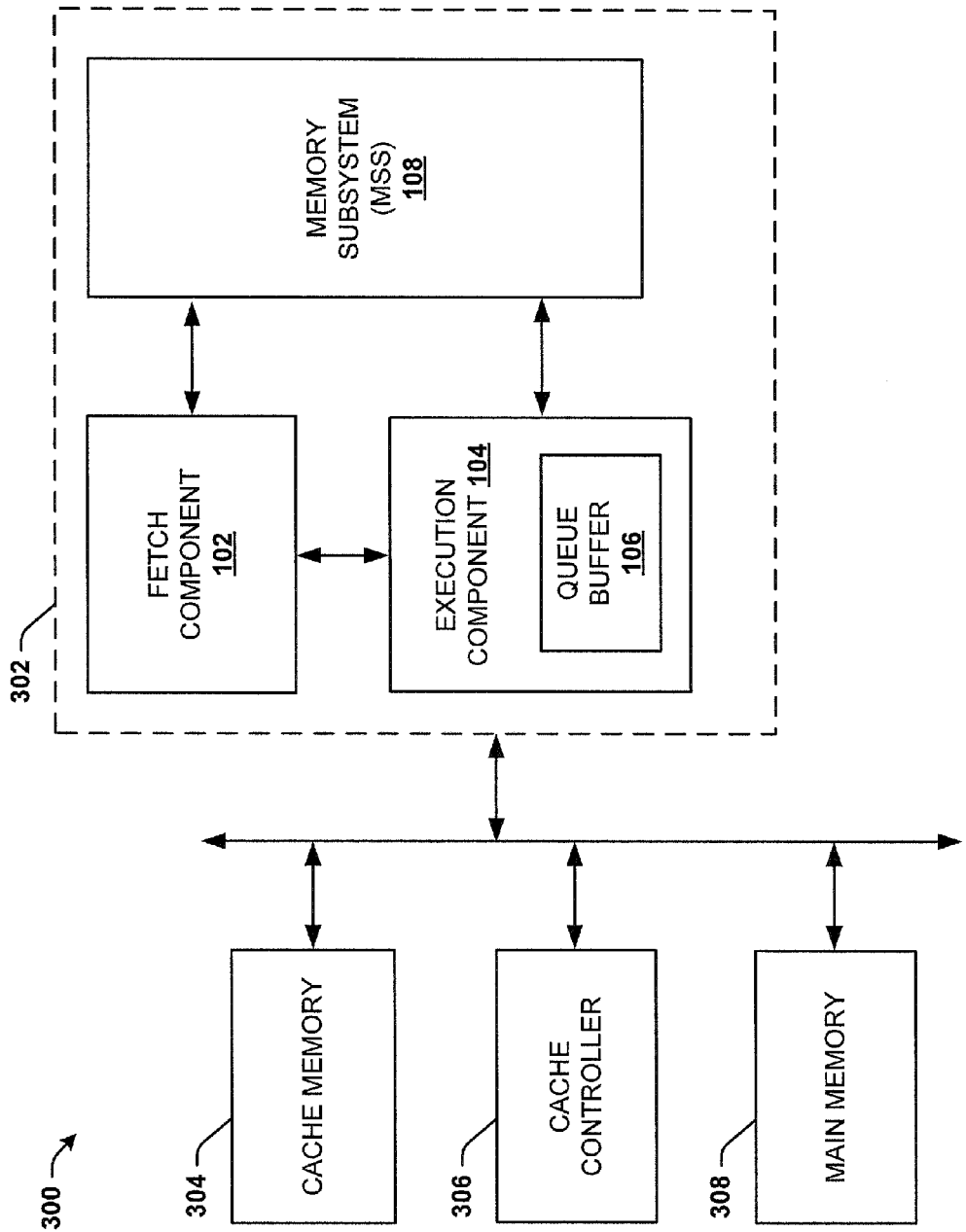
FIG. 3 is a block diagram illustrating an example, non-limiting embodiment of a shared memory system in accordance with various aspects described herein.

Referring now to FIG. 3, a block diagram illustrating an example, non-limiting embodiment of a system in accordance with various aspects described herein is shown. System 300 can include a processor 302, a cache memory 304, a cache controller 306 and a main memory 308. The processor 302 can correspond to the system 100 or the system 200. For example, the processor 302 can include the fetch component 102, the execution component 104, the queue buffer 106 and/or the MSS 108. In an aspect, the cache memory 304, the cache controller 306 and/or the main memory 308 can be implemented in the MSS 108.

In one example, the cache memory 304 can be implemented as a primary cache (e.g., a Level-1 cache). In another example, the cache memory 304 can be implemented as a secondary cache (e.g., a Level-2 cache). However, it is to be appreciated that the cache memory 304 can be implemented as a different type of cache memory. In another aspect, the cache memory 304 can include one or more levels of cache. The cache controller 406 can manage the cache memory 304 so that the cache memory 304 includes a most recent copy of data that matches data in the main memory 308 (e.g., system memory 308). For example, the cache controller 306 can manage the cache memory 304 so that the cache memory 304 includes a most recent copy of processor instructions that match processor instructions in the main memory 308 (e.g., system memory 308). The main memory 308 can be main memory of a multiprocessor system (e.g., memory that one or more processors can read and write to). The main memory 308 can store one or more load instructions and/or one or more store instructions. In an aspect, the fetch component 102 can receive a load instruction(s) and/or a store instruction(s) from the main memory 308.

Figure 4:
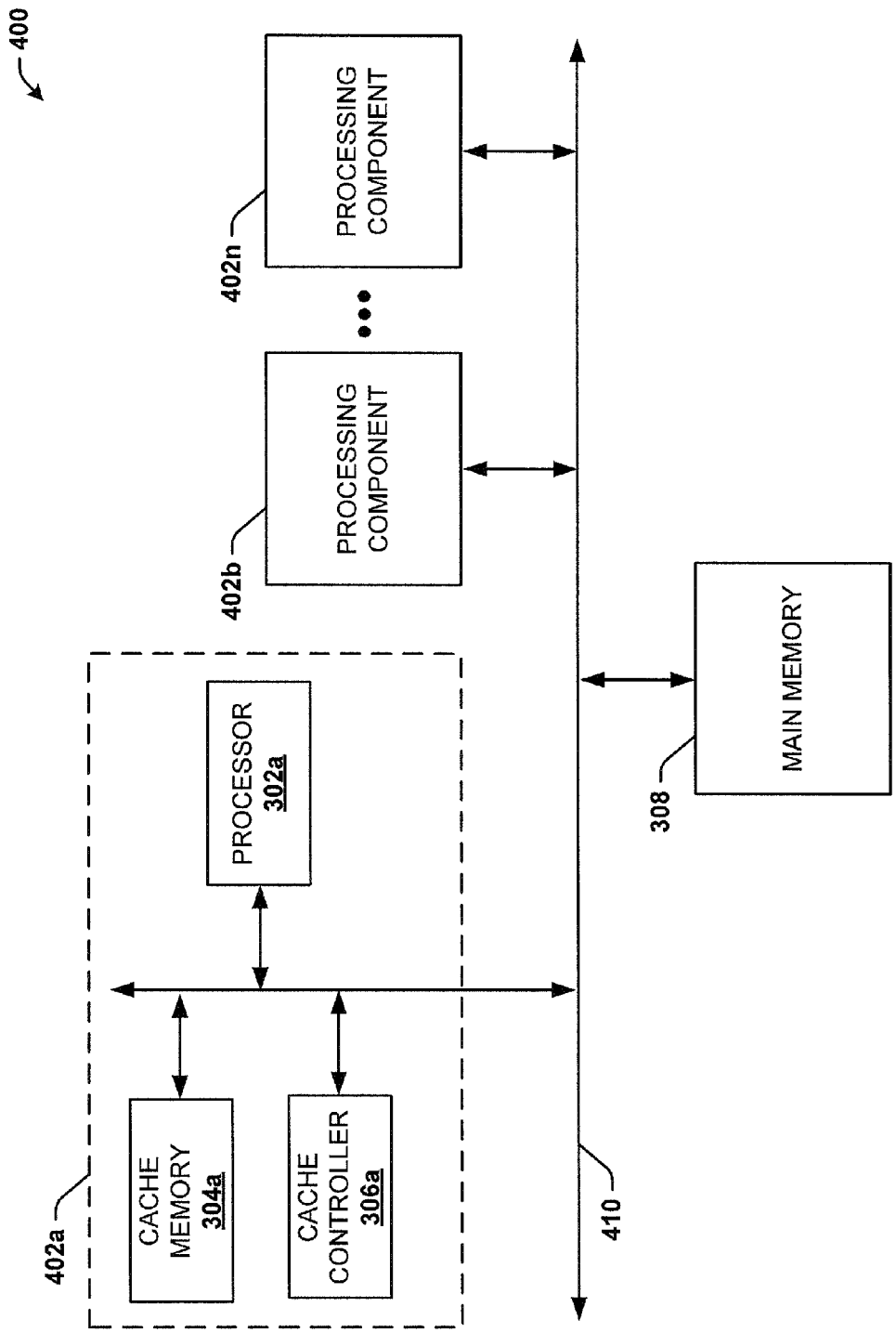
FIG. 4 is a block diagram illustrating an example, non-limiting embodiment of a multiprocessor system in accordance with various aspects described herein.

Referring now to FIG. 4, a block diagram illustrating an example, non-limiting embodiment of a system in accordance with various aspects described herein is shown. In one example, the system 400 can be implemented as a shared-memory multiprocessor system.

System 400 can include one or more processing components 402a-n and the main memory 308. The system 400 can also include one or more processor 302a-n, one or more cache memories 304a-n and one or more cache controllers 306a-n. Each of the one or more processing components 402a-n can include a processor (e.g., processor 302 shown in FIG. 3), a cache memory (e.g., cache memory 304 shown in FIG. 3) and/or a cache controller (e.g., cache controller 306 shown in FIG. 3). For example, the processing component 402a can include processor 302a, cache memory 304a and cache controller 306a, the processing component 402b can include processor 302b, cache memory 304b and cache controller 306b, etc. In one example, a cache controller (e.g. a cache controller 306a-n) can be implemented separate from a processor (e.g., a processor 302a-n). In another example, a processor (e.g., a processor 302a-n) can include a cache controller (e.g., a cache controller 306a-n). In one example, the one or more processors 302a-n can be implemented as processor cores (e.g., processor cores in a multi-core processor).

A copy of data stored in the main memory 308 can be stored in each of the cache memories 304a-n. For example, a copy of processor instructions stored in the main memory 308 can be stored in each of the cache memories 304a-n. Therefore, when data is updated in the main memory 308, the copies of the data stored in each of the cache memories 304a-n can also be updated. As such, the one or more cache controllers 306a-n can manage the cache memories 304a-n so that a most recent copy of data (e.g., processor instructions) is stored in each of the cache memories 304a-n (e.g., a copy of data that matches data in the main memory 308 is stored in each of the cache memories 304a-n). Therefore, cache coherency while executing processor instructions out-of-order can be achieved.

In one implementation, a cache controller, a processor and/or a cache memory in each processing component 402a-n can be coupled via a bus (e.g., a bus 410 and/or a bus coupled to the bus 410). In another implementation, only a cache controller in each processing component 402a-n can be coupled to the bus 410, where the cache controller can additionally be coupled to a processor and a cache memory. As such, a cache controller in each processing component 402a-n can isolate a processor and/or a cache memory from the bus 410.

In view of the example systems described above, methods that may be implemented in accordance with the described subject matter may be better appreciated with reference to the flow charts of FIGS. 5-8. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Figure 5:
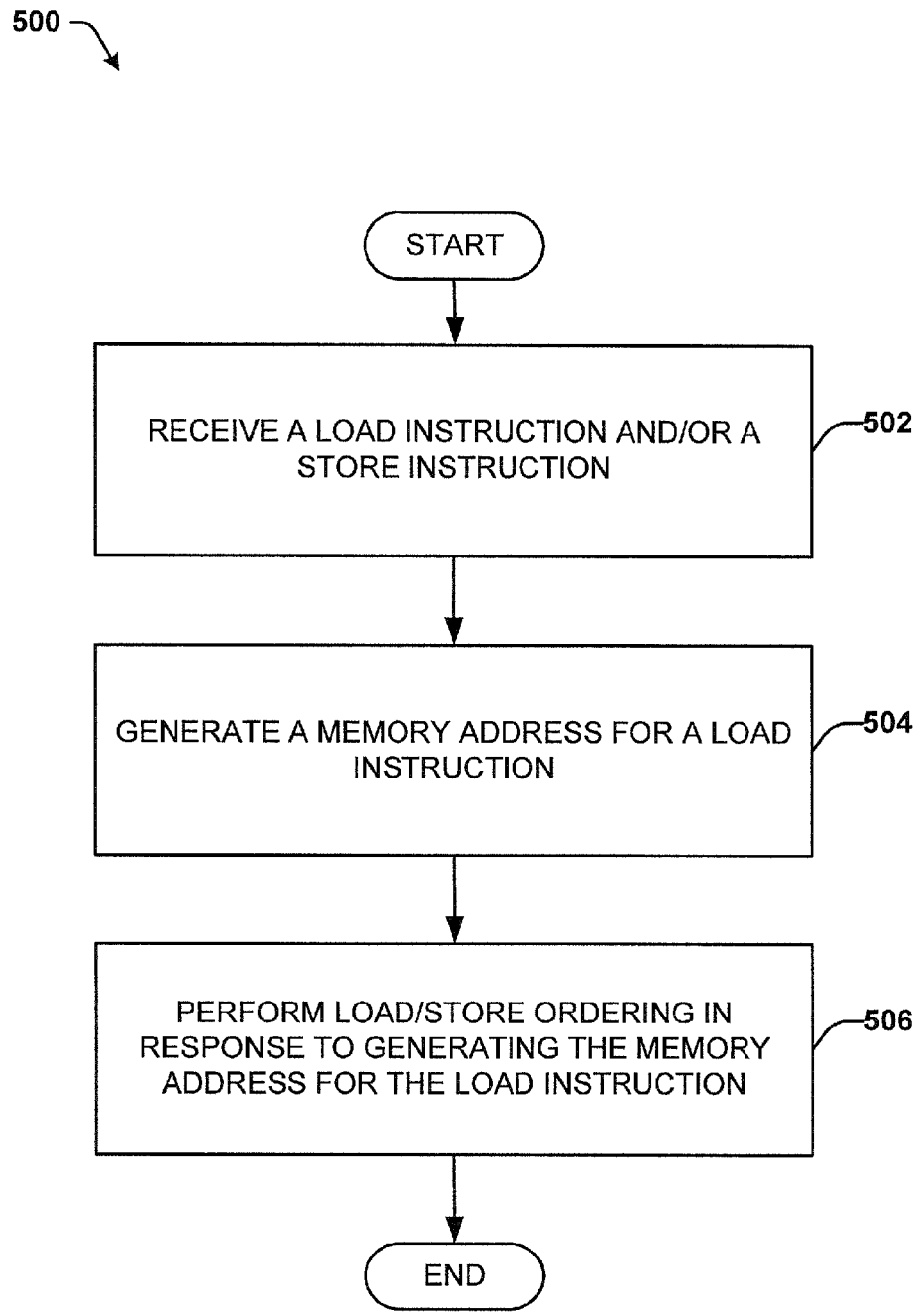
FIG. 5 illustrates a flow diagram of an example, non-limiting embodiment of a method for performing load/store ordering.

Referring to FIG. 5, a flow diagram of an example, non-limiting embodiment of a method for facilitating load/store ordering (e.g., in association with executing processor instructions out-of-order) is shown. Method 500 can begin at block 502, where a load instruction and/or a store instruction is received (e.g., by a fetch component 102). For example, a load instruction and/or a store instruction (e.g., a processor instruction) in an instruction pipeline can be received. In an aspect, the load instruction and/or the store instruction can be received from a main memory (e.g., a main memory 408).

At block 504, a memory address for a load instruction is generated (e.g., by an execution component 104). For example, a virtual address for a load instruction can be generated.

At block 506, load/store ordering is performed (e.g., by an execution component 104) in response to generating the memory address for the load instruction. For example, load/store ordering can be deferred until at least the memory address (e.g., the virtual address) for the load instruction is calculated. Load/store ordering can include at least allocating data (e.g., load instructions and/or store instructions) to a queue buffer (e.g., queue buffer 106), executing load instructions and/or store instructions, etc.

Figure 6:
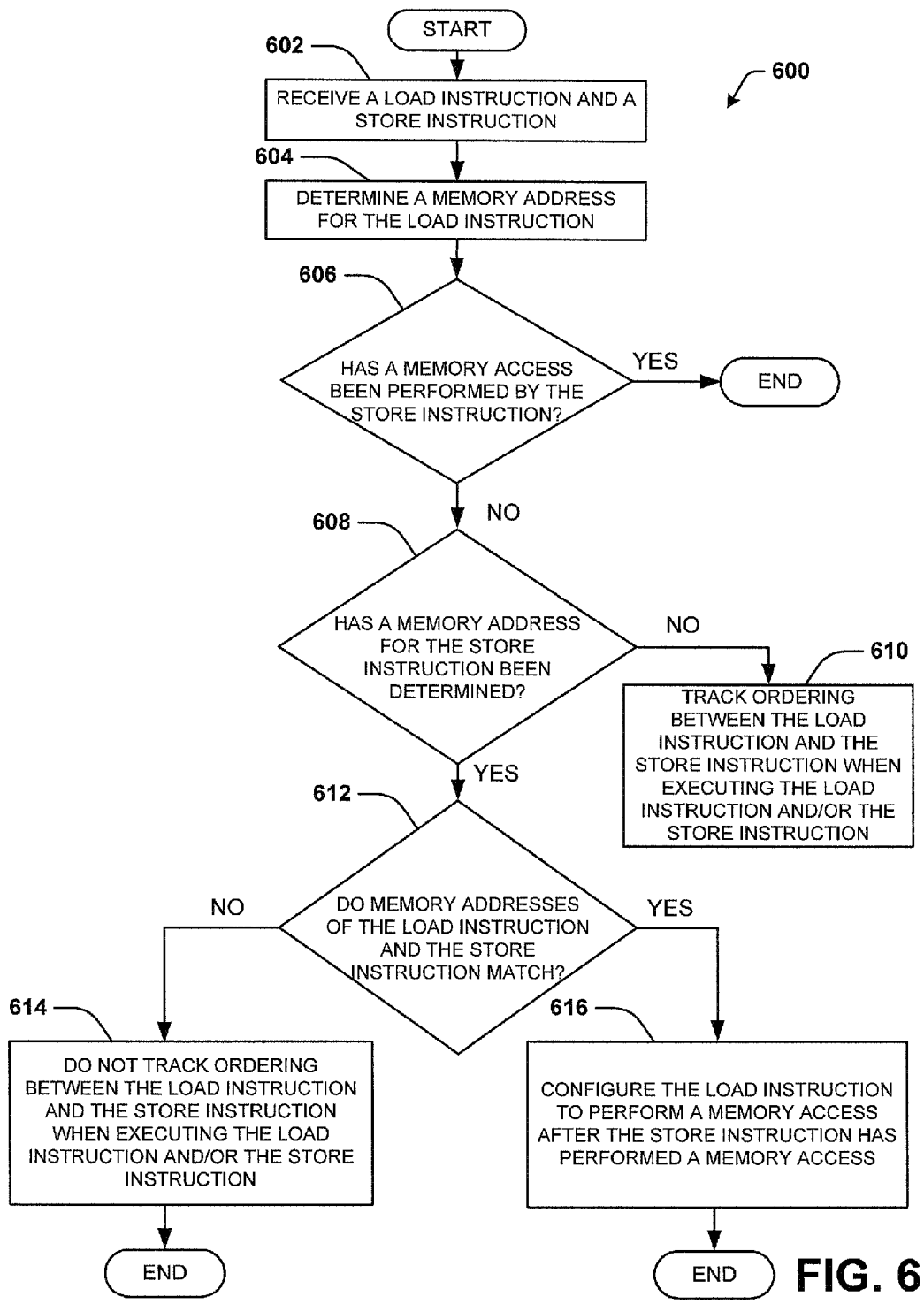
FIG. 6 illustrates a flow diagram of an example, non-limiting embodiment of a method for facilitating load/store ordering.

Referring now to FIG. 6, a flow diagram of another example, non-limiting embodiment of a method for facilitating load/store ordering (e.g., in association with executing processor instructions out-of-order) is shown. Method 600 can begin at block 602, where a load instruction and a store instruction is received (e.g., by a fetch component 102). For example, a load instruction and a store instruction (e.g., a processor instructions) in an instruction pipeline can be received.

At block 604, a memory address for the load instruction is determined (e.g., by an execution component 104). For example, a virtual address for the load instruction can be determined.

At block 606, it is determined whether a memory access has been performed by the store instruction. For example, it can be determined whether the store instruction has accessed memory. If yes, method 600 can end (e.g., ordering for the load instruction is not tracked and/or tracking of ordering for the load instruction is stopped). If no, method 600 can proceed to block 608.

At block 608, it is determined whether a memory address for the store instruction has been determined (e.g., by an execution component 104). For example, it can be determined whether the store instruction is associated with a memory address (e.g., whether a memory address has been generated for the store instruction) to allow the store instruction to perform a memory access. If no, method 600 can proceed to block 610. If yes, method 600 can proceed to block 612.

At block 610, ordering between the load instruction and the store instruction is tracked (e.g., by an execution component 104) when executing the load instruction and/or the store instruction. For example, ordering for the load instruction can be tracked since a potential ordering violation exists.

At block 612, it is determined (e.g., by an execution component 104) whether memory addresses of the load instruction and the store instruction match. For example, it can be determined whether the load instruction is dependent on the store instruction by comparing a memory address (e.g., least significant bits, one or more untranslated bits) of the load instruction with a memory address (e.g., least significant bits, one or more untranslated bits) of the store instruction. If no, method 600 can proceed to block 616. If yes, method 600 can proceed to block 616.

At block 614, ordering between the load instruction and the store instruction is not tracked (e.g., by an execution component 104) when executing the load instruction and/or the store instruction. For example, the load instruction and/or the store instruction can be permitted to execute without being allocated to a queue buffer (e.g., a queue buffer 106). After block 614, the method 600 can end (e.g., ordering for the load instruction is not tracked and/or tracking of ordering for the load instruction is stopped).

At block 616, the load instruction is configured (e.g., by an execution component 104) to perform a memory access after the store instruction has performed a memory access. For example, the load instruction can be configured to wait to perform unit after the store instruction has performed a memory access since an ordering hazard exists (e.g., since it has been determined that an instruction pipeline hazard exists). After block 616, the method 600 can end.

Figure 7:
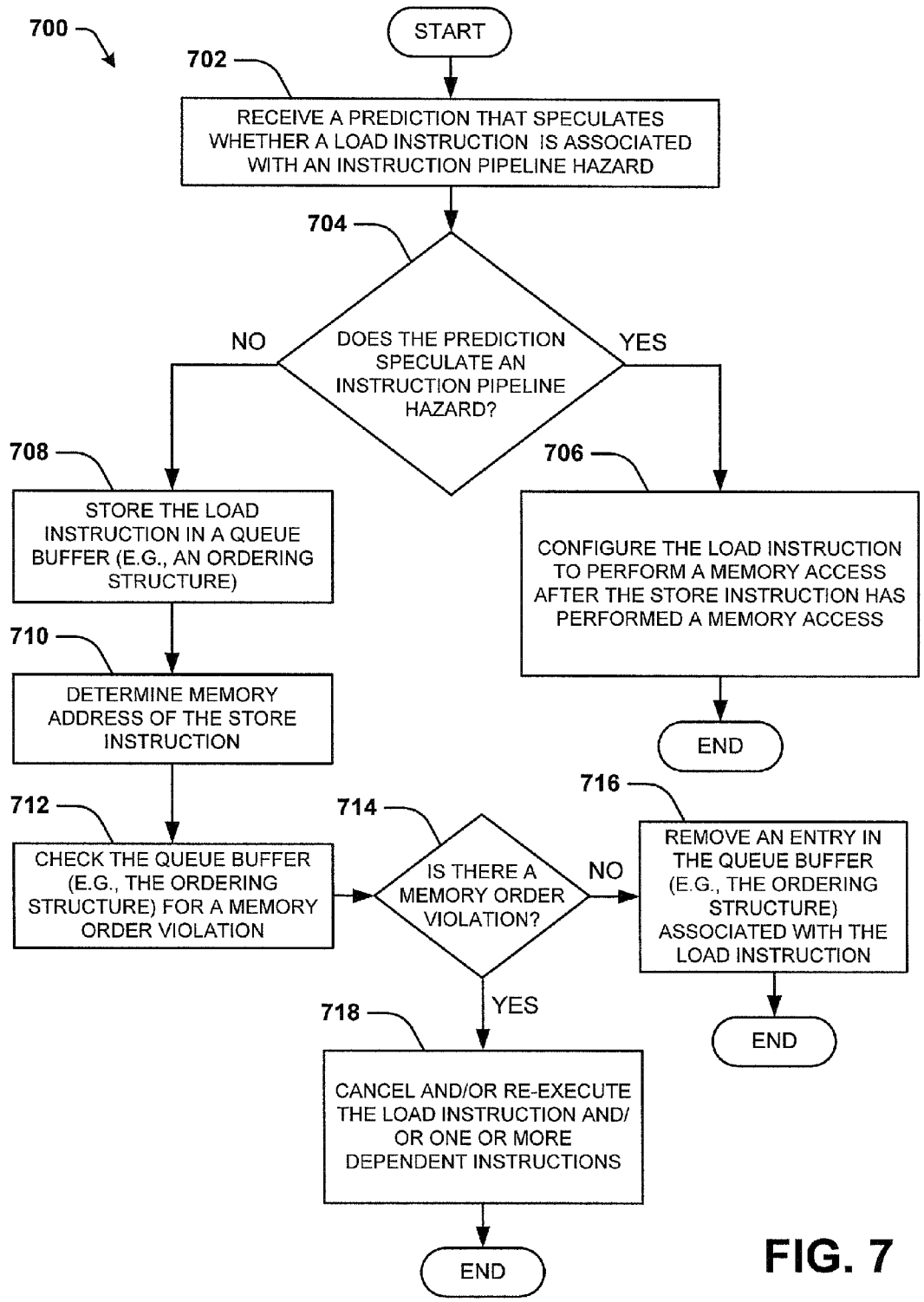
FIG. 7 illustrates a flow diagram of an example, non-limiting embodiment of a method for tracking ordering between a load instruction and a store instruction.

Referring now to FIG. 7, a flow diagram of an example, non-limiting embodiment of a method for tracking ordering between a load instruction and a store instruction (e.g., in association with executing the load instruction and/or the store instruction out-of-order) is shown. Method 700 can provide further details for block 610. Method 700 can begin at block 702, where a prediction that speculates whether a load instruction is associated with an instruction pipeline hazard is received (e.g., by execution component 104). For example, execution component 104 can receive an instruction pipeline hazard prediction (e.g. a prediction value) from prediction component 202.

At block 704, it is determined (e.g., by execution component 104) whether the prediction speculates an instruction pipeline hazard. For example, execution component 104 can determine whether the instruction pipeline hazard prediction (e.g., the prediction value) speculates that an instruction pipeline hazard will occur (e.g., whether an instruction pipeline hazard is likely). In one example, it is determined (e.g., by execution component 104) whether the prediction speculates an instruction pipeline hazard based on a threshold value (e.g., the prediction value being above the threshold value can correspond to a likely instruction pipeline hazard). If yes, method 700 can proceed to block 706. If no, method 700 can proceed to block 708.

At block 706, the load instruction is configured (e.g., by an execution component 104) to perform a memory access after the store instruction has performed a memory access. For example, the load instruction can be configured to wait to perform unit after the store instruction has performed a memory access since an ordering hazard exists (e.g., since it has been determined that an instruction pipeline hazard exists). As such, the load instruction is not allocated to a queue buffer (e.g., an ordering structure). After block 706, the method 700 can end.

At block 708, the load instruction is stored (e.g., by execution component 104) in a queue buffer (e.g., an ordering structure). For example, the load instruction can be allocated to queue buffer 106 (e.g., a memory access of the load instruction can be performed speculatively).

At block 710, a memory address of the store instruction is determined (e.g., by execution component 104). For example, a memory address (e.g., a physical address) of the store instruction can be determined to allow the store instruction to perform a memory access.

At block 712, the queue buffer (e.g., the ordering structure) is checked for a memory order violation (e.g., by an execution component 104). For example, the queue buffer 106 can be analyzed.

At block 714, it can be determined (e.g., by an execution component 104) whether there is a memory order violation. For example, it can be determined whether the queue buffer (e.g., the queue buffer 106) is associated with a memory order violation.

If no, method 700 can proceed to block 716. At block 716, an entry in the queue buffer (e.g., the ordering structure) associated with the load instruction is removed. For example, an entry in the queue buffer 106 associated with the load instruction can be erased. After block 716, the method 700 can end.

If yes, method 700 can proceed to block 718. At block 718, the load instruction and/or one or more dependent instructions are cancelled and/or re-executed (e.g., by an execution component 104). For example, the load instructions and/or one or more load instructions allocated to the queue buffer 106 after the load instruction can be cancelled and/or re-executed. After block 718, the method 700 can end.

Figure 8:
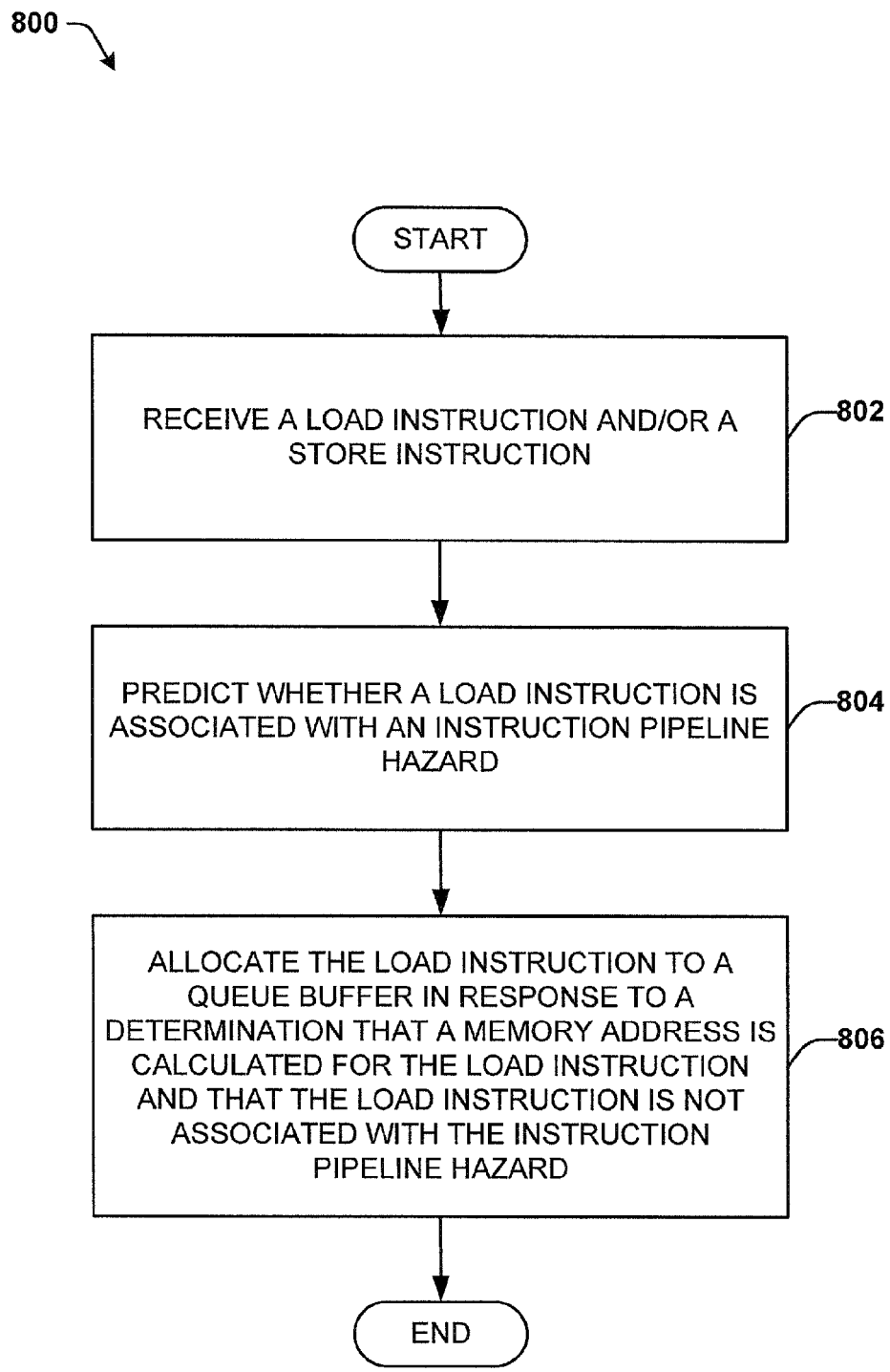
FIG. 8 illustrates a flow diagram of an example, non-limiting embodiment of a method for allocating data to a buffer.

Referring now to FIG. 8, a flow diagram of an example, non-limiting embodiment of a method for facilitating load/store ordering (e.g., in association with executing processor instructions out-of-order) is shown. Method 800 can begin at block 802, where a load instruction and/or a store instruction is received (e.g., by fetch component 102). For example, a load instruction and/or a store instruction (e.g., a processor instruction) in an instruction pipeline can be received.

At 804, it is predicted (e.g., by fetch component 102) whether a load instruction is associated with an instruction pipeline hazard. For example, one or more instruction pipeline hazard predictions can be generated and/or stored in a prediction component 202.

At 806, the load instruction is allocated to a queue buffer (e.g., by execution component 104) in response to a determination that a memory address is calculated for the load instruction and that the load instruction is not associated with the instruction pipeline hazard. For example, allocation of the load instruction to a queue buffer (e.g., queue buffer 106) can be delayed until a memory address (e.g., a virtual address) is calculated for the load instruction (e.g., load/store ordering can be delayed until a memory address is calculated for the load instruction).

Example Computing Environment

Figure 9:
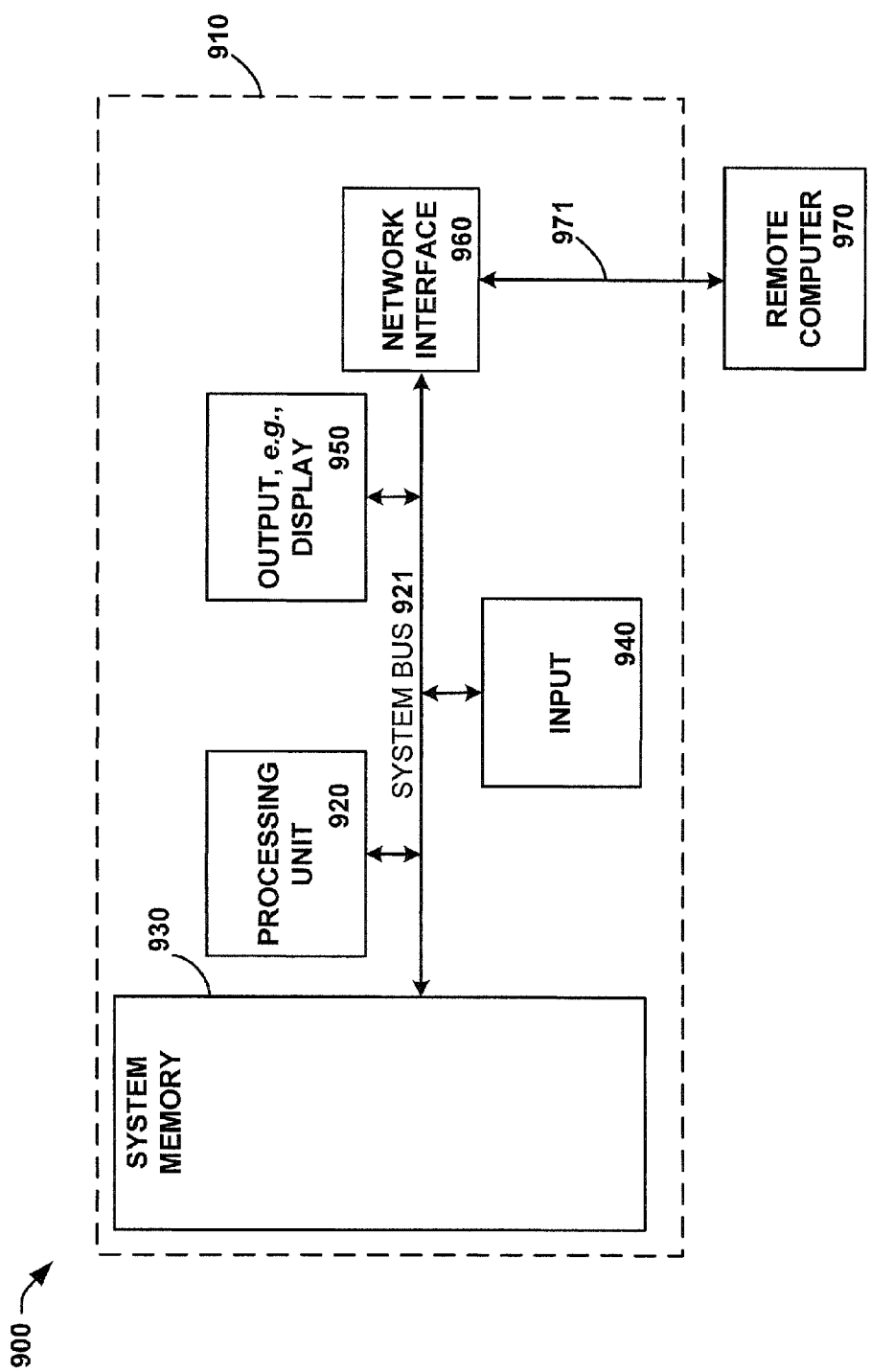
FIG. 9 illustrates a block diagram of an example electronic computing environment that can be implemented in conjunction with one or more aspects described herein.

As mentioned, advantageously, the techniques described herein can be applied to any device and/or network where detection of memory order violations is desirable. It is to be understood, therefore, that handheld, portable and other computing devices and computing objects of all kinds are contemplated for use in connection with the various non-limiting embodiments, i.e., anywhere that a device may wish to detect memory order violations. Accordingly, the below general purpose remote computer described below in FIG. 9 is but one example, and the disclosed subject matter can be implemented with any client having network/bus interoperability and interaction. Thus, the disclosed subject matter can be implemented in an environment of networked hosted services in which very little or minimal client resources are implicated, e.g., a networked environment in which the client device serves merely as an interface to the network/bus, such as an object placed in an appliance.

Although not required, some aspects of the disclosed subject matter can partly be implemented via an operating system, for use by a developer of services for a device or object, and/or included within application software that operates in connection with the component(s) of the disclosed subject matter. Software may be described in the general context of computer executable instructions, such as program modules or components, being executed by one or more computer(s), such as projection display devices, viewing devices, or other devices. Those skilled in the art will appreciate that the disclosed subject matter may be practiced with other computer system configurations and protocols.

FIG. 9 thus illustrates an example of a suitable computing system environment 900 in which some aspects of the disclosed subject matter can be implemented, although as made clear above, the computing system environment 900 is only one example of a suitable computing environment for a device and is not intended to suggest any limitation as to the scope of use or functionality of the disclosed subject matter. Neither should the computing environment 900 be interpreted as having any dependency or requirement relating to any one or combination of components illustrated in the exemplary operating environment 900.

With reference to FIG. 9, an exemplary device for implementing the disclosed subject matter includes a general-purpose computing device in the form of a computer 910. Components of computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures.

Computer 910 typically includes a variety of computer readable media. Computer readable media can be any available media that can be accessed by computer 910. By way of example, and not limitation, computer readable media can comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 910. Communication media typically embodies computer readable instructions, data structures, program modules, or other data in a modulated data signal such as a carrier wave or other transport mechanism and includes any information delivery media.

The system memory 930 may include computer storage media in the form of volatile and/or nonvolatile memory such as read only memory (ROM) and/or random access memory (RAM). A basic input/output system (BIOS), containing the basic routines that help to transfer information between elements within computer 910, such as during start-up, may be stored in memory 930. Memory 930 typically also contains data and/or program modules that are immediately accessible to and/or presently being operated on by processing unit 920. By way of example, and not limitation, memory 930 may also include an operating system, application programs, other program modules, and program data.

The computer 910 may also include other removable/non-removable, volatile/nonvolatile computer storage media. For example, computer 910 could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. A hard disk drive is typically connected to the system bus 921 through a non-removable memory interface such as an interface, and a magnetic disk drive or optical disk drive is typically connected to the system bus 921 by a removable memory interface, such as an interface.

A user can enter commands and information into the computer 910 through input devices such as a keyboard and pointing device, commonly referred to as a mouse, trackball, or touch pad. Other input devices can include a microphone, joystick, game pad, satellite dish, scanner, wireless device keypad, voice commands, or the like. These and other input devices are often connected to the processing unit 920 through user input 940 and associated interface(s) that are coupled to the system bus 921, but may be connected by other interface and bus structures, such as a parallel port, game port, or a universal serial bus (USB). A graphics subsystem can also be connected to the system bus 921. A projection unit in a projection display device, or a HUD in a viewing device or other type of display device can also be connected to the system bus 921 via an interface, such as output interface 950, which may in turn communicate with video memory. In addition to a monitor, computers can also include other peripheral output devices such as speakers which can be connected through output interface 950.

The computer 910 can operate in a networked or distributed environment using logical connections to one or more other remote computer(s), such as remote computer 970, which can in turn have media capabilities different from device 910. The remote computer 970 can be a personal computer, a server, a router, a network PC, a peer device, personal digital assistant (PDA), cell phone, handheld computing device, a projection display device, a viewing device, or other common network node, or any other remote media consumption or transmission device, and may include any or all of the elements described above relative to the computer 910. The logical connections depicted in FIG. 9 include a network 971, such local area network (LAN) or a wide area network (WAN), but can also include other networks/buses, either wired or wireless. Such networking environments are commonplace in homes, offices, enterprise-wide computer networks, intranets and the Internet.

When used in a LAN networking environment, the computer 910 can be connected to the LAN 971 through a network interface 960 or adapter. When used in a WAN networking environment, the computer 910 can typically include a communications component, such as a modem, or other means for establishing communications over the WAN, such as the Internet. A communications component, such as wireless communications component, a modem and so on, which can be internal or external, can be connected to the system bus 921 via the user input interface of input 940, or other appropriate mechanism. In a networked environment, program modules depicted relative to the computer 910, or portions thereof, can be stored in a remote memory storage device. It will be appreciated that the network connections shown and described are exemplary and other means of establishing a communications link between the computers can be used.

Example Networking Environment

Figure 10:
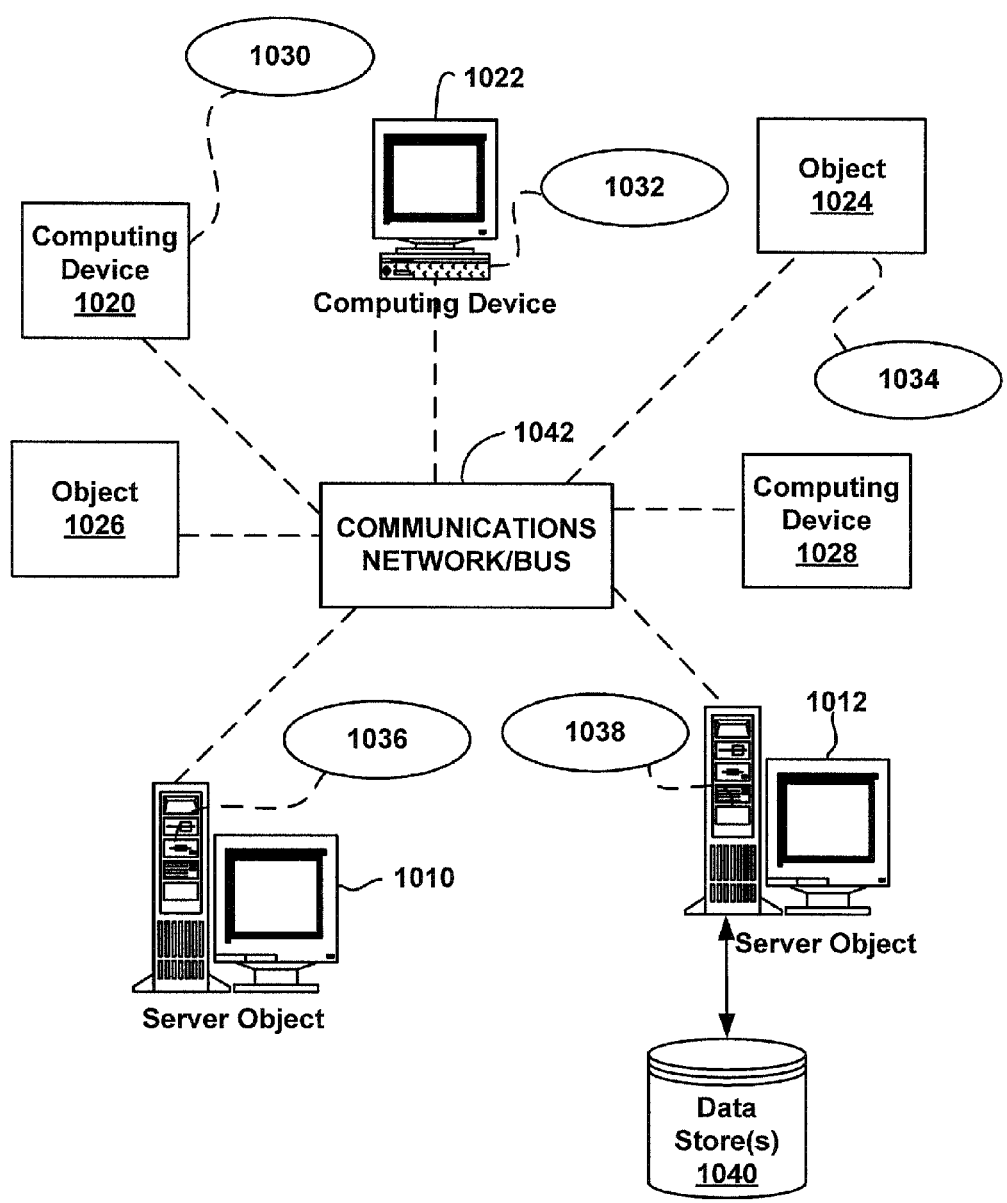
FIG. 10 illustrates a block diagram of an example data communication network that can be operable in conjunction with various aspects described herein.

FIG. 10 provides a schematic diagram of an exemplary networked or distributed computing environment. The distributed computing environment comprises computing objects 1010, 1012, etc. and computing objects or devices 1020, 1022, 1024, 1026, 1028, etc., which may include programs, methods, data stores, programmable logic, etc., as represented by applications 1030, 1032, 1034, 1036, 1038 and data store(s) 1040. It can be appreciated that computing objects 1010, 1012, etc. and computing objects or devices 1020, 1022, 1024, 1026, 1028, etc. may comprise different devices, including a multimedia display device or similar devices depicted within the illustrations, or other devices such as a mobile phone, personal digital assistant (PDA), audio/video device, MP3 players, personal computer, laptop, etc. It should be further appreciated that data store(s) 1040 can include one or more cache memories, one or more registers, or other similar data stores disclosed herein.

Each computing object 1010, 1012, etc. and computing objects or devices 1020, 1022, 1024, 1026, 1028, etc. can communicate with one or more other computing objects 1010, 1012, etc. and computing objects or devices 1020, 1022, 1024, 1026, 1028, etc. by way of the communications network 1042, either directly or indirectly. Even though illustrated as a single element in FIG. 10, communications network 1042 may comprise other computing objects and computing devices that provide services to the system of FIG. 10, and/or may represent multiple interconnected networks, which are not shown. Each computing object 1010, 1012, etc. or computing object or devices 1020, 1022, 1024, 1026, 1028, etc. can also contain an application, such as applications 1030, 1032, 1034, 1036, 1038, that might make use of an API, or other object, software, firmware and/or hardware, suitable for communication with or implementation of the techniques and disclosure described herein.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems automatic diagnostic data collection as described in various embodiments herein.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service, in some cases without having to "know" any working details about the other program or the service itself.

In a client/server architecture, particularly a networked system, a client is usually a computer that accesses shared network resources provided by another computer, e.g., a server. In the illustration of FIG. 10, as a non-limiting example, computing objects or devices 1020, 1022, 1024, 1026, 1028, etc. can be thought of as clients and computing objects 1010, 1012, etc. can be thought of as servers where computing objects 1010, 1012, etc., acting as servers provide data services, such as receiving data from client computing objects or devices 1020, 1022, 1024, 1026, 1028, etc., storing of data, processing of data, transmitting data to client computing objects or devices 1020, 1022, 1024, 1026, 1028, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1042 or bus is the Internet, for example, the computing objects 1010, 1012, etc. can be Web servers with which other computing objects or devices 1020, 1022, 1024, 1026, 1028, etc. communicate via any of a number of known protocols, such as the hypertext transfer protocol (HTTP). Computing objects 1010, 1012, etc. acting as servers may also serve as clients, e.g., computing objects or devices 1020, 1022, 1024, 1026, 1028, etc., as may be characteristic of a distributed computing environment.

Reference throughout this specification to "one embodiment," "an embodiment," "an example", "a disclosed aspect," or "an aspect" means that a particular feature, structure, or characteristic described in connection with the embodiment or aspect is included in at least one embodiment or aspect of the present disclosure. Thus, the appearances of the phrase "in one embodiment," "in one example," "in one aspect," or "in an embodiment," in various places throughout this specification are not necessarily all referring to the same embodiment. Furthermore, the particular features, structures, or characteristics may be combined in any suitable manner in various disclosed embodiments.

As utilized herein, terms "component," "system," "architecture," "engine" and the like are intended to refer to a computer or electronic-related entity, either hardware, a combination of hardware and software, software (e.g., in execution), or firmware. For example, a component can be one or more transistors, a memory cell, an arrangement of transistors or memory cells, a gate array, a programmable gate array, an application specific integrated circuit, a controller, a processor, a process running on the processor, an object, executable, program or application accessing or interfacing with semiconductor memory, a computer, or the like, or a suitable combination thereof. The component can include erasable programming (e.g., process instructions at least in part stored in erasable memory) or hard programming (e.g., process instructions burned into non-erasable memory at manufacture).

By way of illustration, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, . . . ) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

In addition to the foregoing, the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The terms "apparatus" and "article of manufacture" where used herein are intended to encompass an electronic device, a semiconductor device, a computer, or a computer program accessible from any computer-readable device, carrier, or media. Computer-readable media can include hardware media, or software media. In addition, the media can include non-transitory media, or transport media. In one example, non-transitory media can include computer readable hardware media. Specific examples of computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include carrier waves, or the like. Of course, those skilled in the art will recognize many modifications can be made to this configuration without departing from the scope or spirit of the disclosed subject matter.

What has been described above includes examples of the subject innovation. It is, of course, not possible to describe every conceivable combination of components or methodologies for purposes of describing the subject innovation, but one of ordinary skill in the art can recognize that many further combinations and permutations of the subject innovation are possible. Accordingly, the disclosed subject matter is intended to embrace all such alterations, modifications and variations that fall within the spirit and scope of the disclosure. Furthermore, to the extent that a term "includes", "including", "has" or "having" and variants thereof is used in either the detailed description or the claims, such term is intended to be inclusive in a manner similar to the term "comprising" as "comprising" is interpreted when employed as a transitional word in a claim.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Additionally, some portions of the detailed description have been presented in terms of algorithms or process operations on data bits within electronic memory. These process descriptions or representations are mechanisms employed by those cognizant in the art to effectively convey the substance of their work to others equally skilled. A process is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise or apparent from the foregoing discussion, it is appreciated that throughout the disclosed subject matter, discussions utilizing terms such as processing, computing, calculating, determining, or displaying, and the like, refer to the action and processes of processing systems, and/or similar consumer or industrial electronic devices or machines, that manipulate or transform data represented as physical (electrical and/or electronic) quantities within the registers or memories of the electronic device(s), into other data similarly represented as physical quantities within the machine and/or computer system memories or registers or other such information storage, transmission and/or display devices.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In addition, while a particular feature may have been disclosed with respect to only one of several implementations, such feature may be combined with one or more other features of the other implementations as may be desired and advantageous for any given or particular application. It will also be recognized that the embodiments include a system as well as a computer-readable medium having computer-executable instructions for performing the acts and/or events of the various processes.

What is claimed is:

1. A system, comprising:
   a processor, comprising:
      a prediction component configured for predicting whether a load instruction in the system is associated with an instruction pipeline hazard; and
      an execution component configured for determining whether a memory address is calculated for the load instruction, for allocating the load instruction to a queue buffer in the system in response to a first determination that the memory address is calculated for the load instruction and a second determination that the prediction component predicts that the load instruction is not associated with the instruction pipeline hazard, and for cancelling execution of the load instruction in response to the second determination that the load instruction is not associated with the instruction pipeline hazard and a third determination that the queue buffer is associated with a memory order violation.

2. The system of claim 1, wherein the execution component is configured for comparing a set of untranslated bits of the load instruction and a store instruction associated with the load instruction in response to the first determination that the memory address is calculated for the load instruction.

3. The system of claim 1, wherein the execution component is configured for cancelling execution of one or more other load instructions allocated to the queue buffer in response to the second determination that the load instruction is not associated with the instruction pipeline hazard and the third determination that the queue buffer is associated with the memory order violation.

4. The system of claim 1, wherein the execution component is configured for allocating the load instruction to the queue buffer in response to a fourth determination that another memory address for a store instruction associated with the load instruction has not been calculated.

5. The system of claim 4, wherein the execution component is configured for determining whether the queue buffer is associated with a memory order violation in response to the other memory address being determined for the store instruction.

6. The system of claim 5, wherein the execution component is configured for cancelling execution of the load instruction associated with the store instruction in response to a fourth determination that the queue buffer is associated with the memory order violation.

7. The system of claim 5, wherein the execution component is configured for removing an entry associated with the load instruction from the queue buffer in response to a fourth determination that the queue buffer is not associated with the memory order violation.

8. The system of claim 6, wherein the execution component is configured for determining dependency between the load instruction and the store instruction by comparing the memory address of the load instruction and another memory address of the store instruction.

9. The system of claim 8, wherein the execution component is configured for withholding allocation of the load instruction to the queue buffer in response to a fifth determination that the memory address of the load instruction does not match the other memory address of the store instruction.

10. The system of claim 6, wherein the execution component is configured for determining dependency between the load instruction and the store instruction by comparing a portion of the memory address of the load instruction and a corresponding portion of the other memory address of the store instruction.

11. The system of claim 1, wherein the execution component is configured for not allocating the load instruction to the queue buffer in response to a fourth determination that the load instruction is associated with the instruction pipeline hazard.

12. The system of claim 1, wherein the queue buffer is configured for storing a hashed memory address of the load instruction, and wherein the execution component comprises the queue buffer.

13. The system of claim 1, wherein the prediction component is configured for assigning a risk value to the load instruction that indicates a likelihood of the instruction pipeline hazard.

14. A computer implemented method, comprising:
receiving a load instruction and a store instruction in a computer system;
predicting whether a load instruction is associated with an instruction pipeline hazard in the computing system;
determining whether a memory address is calculated for the load instruction;
allocating the load instruction to a queue buffer in the computing system in response to a determination that the memory address is calculated for the load instruction and a prediction that the load instruction is not associated with the instruction pipeline hazard; and
cancelling execution of the load instruction in response to the prediction that the load instruction is not associated with the instruction pipeline hazard and a determination that the queue buffer is associated with a memory order violation.

15. The computer implemented method of claim 14, wherein the allocating comprises allocating the load instruction to the queue buffer in response to a determination that a virtual address is calculated for the load instruction.

16. The computer implemented method of claim 14, further comprising:
determining whether a memory access has been performed by the store instruction;
determining whether another memory address for the store instruction has been calculated; and
determining whether memory addresses of the load instruction and the store instruction match in response to a determination that the other memory address is calculated for the store instruction.

17. The computer implemented method of claim 16, further comprising:
tracking ordering between the load instruction and the store instruction in response to a determination that the other memory address is not calculated for the store instruction.

18. The computer implemented method of claim 16, further comprising:
not tracking ordering between the load instruction and the store instruction in response to a determination that the memory addresses of the load instruction and the store instruction do not match.

19. The computer implemented method of claim 16, further comprising:
configuring the load instruction to access a memory after the store instruction has accessed the memory in response to a determination that the memory addresses of the load instruction and the store instruction match.

20. The computer implemented method of claim 14, further comprising:
determining another memory address of the store instruction;
analyzing the queue buffer for a memory order violation; and
removing an entry from the queue buffer associated with the load instruction in response to a determination that the queue buffer is not associated with a memory order violation.

21. The computer implemented method of claim 14, further comprising:
configuring the load instruction to access a memory after the store instruction has accessed the memory in response to a prediction that the load instruction is not associated with the instruction pipeline hazard.

22. A system, comprising:
a main memory configured for storing a load instruction and a store instruction; and
a processor configured for receiving the load instruction and the store instruction from the main memory, the processor comprising a prediction component configured for predicting whether the load instruction is associated with an instruction pipeline hazard, the processor further comprising an execution component configured for determining whether a memory address is calculated for the load instruction, for allocating the load instruction to a queue buffer in response to a determination that the memory address is calculated for the load instruction and a prediction that the load instruction is not associated with the instruction pipeline hazard, and for cancelling execution of the load instruction in response to the prediction that the load instruction is not associated with the instruction pipeline hazard and a determination that the queue buffer is associated with a memory order violation.

* * * * *